(12) United States Patent
Paesano et al.

(10) Patent No.: US 10,081,140 B2
(45) Date of Patent: Sep. 25, 2018

(54) APPARATUS FOR AND METHOD OF COMPACTION OF A PREPREG

(71) Applicant: The Boeing Company, Chicago, IL (US)

(72) Inventors: Antonio Paesano, Ridley Park, PA (US); Steven Cullison, Ridley Park, PA (US)

(73) Assignee: The Boeing Company, Chicago, IL (US)

( * ) Notice: Subject to any disclaimer, the term of this patent is extended or adjusted under 35 U.S.C. 154(b) by 631 days.

(21) Appl. No.: 14/526,706

(22) Filed: Oct. 29, 2014

(65) Prior Publication Data
US 2016/0121553 A1   May 5, 2016

(51) Int. Cl.
*B29C 70/54* (2006.01)
*B29L 31/30* (2006.01)

(52) U.S. Cl.
CPC ............ *B29C 70/541* (2013.01); *B29C 70/54* (2013.01); *B29L 2031/3076* (2013.01)

(58) Field of Classification Search
CPC ..... B29C 70/541; B29C 70/543; B29C 70/54; B29C 70/02; B29C 43/32; B29C 43/361; B29C 2043/3205; B29C 2043/3273; B29C 2043/3626; B29L 2009/00
See application file for complete search history.

(56) References Cited

U.S. PATENT DOCUMENTS

| | | | | | |
|---|---|---|---|---|---|
| 2,510,215 | A | * | 6/1950 | Butterfield | B29C 43/00 156/211 |
| 3,112,729 | A | * | 12/1963 | Prezioso, Jr. | B05C 17/0222 15/230.11 |
| 4,025,686 | A | * | 5/1977 | Zion | B29C 70/025 442/373 |
| 4,338,070 | A | * | 7/1982 | Nava | A42B 3/063 425/112 |
| 4,759,700 | A | * | 7/1988 | Onnenberg | B29C 44/143 425/112 |
| 4,780,262 | A | * | 10/1988 | VonVolkli | B29C 70/342 264/101 |
| 4,954,209 | A | * | 9/1990 | Baron | B29C 43/32 156/583.1 |

(Continued)

OTHER PUBLICATIONS

"Products Overview." LamRight LLC. Wayback Machine Generated, Jun. 14, 2009. Web. <http://www.lamright.com/>.*

(Continued)

*Primary Examiner* — Seyed Masoud Malekzadeh
*Assistant Examiner* — Taryn Trace Willett
(74) *Attorney, Agent, or Firm* — McDonnell Boehnen Hulbert & Berghoff LLP (57) ABSTRACT

A forming apparatus and method of using the apparatus with a concave mandrel to form composite materials is presented where the apparatus has a forming head with an outer surface having a contour that matches the interior surface of the concave cavity of a matching mandrel. A handle and a grip surface to allow an operator to use the forming apparatus to exert a compaction force to successive plies of prepreg to conform the laminate of plies to the interior surface of the concave cavity. Each ply is heated before contact with the forming head of the apparatus.

14 Claims, 5 Drawing Sheets

(56) References Cited

U.S. PATENT DOCUMENTS

| | | | | | |
|---|---|---|---|---|---|
| 5,071,338 | A | * | 12/1991 | Dublinski | B29C 33/307 156/382 |
| 5,087,187 | A | * | 2/1992 | Simkulak | B29C 43/32 264/258 |
| 5,766,534 | A | * | 6/1998 | White | B29B 11/16 264/137 |
| 5,824,255 | A | * | 10/1998 | Ross | B29C 53/04 264/316 |
| 5,830,305 | A | * | 11/1998 | Andersen | B28B 23/0087 156/242 |
| 6,067,668 | A | * | 5/2000 | Rudd | E03D 9/00 4/255.01 |
| 6,558,590 | B1 | * | 5/2003 | Stewart | B29C 43/183 264/134 |
| 6,638,466 | B1 | * | 10/2003 | Abbott | B29C 33/68 264/238 |
| 7,655,168 | B2 | * | 2/2010 | Jones | B29C 70/44 264/258 |
| 9,283,715 | B2 | * | 3/2016 | Schroder | B29C 33/505 |
| 9,314,975 | B1 | * | 4/2016 | Matsen | B29C 51/421 |
| 2002/0002405 | A1 | * | 1/2002 | Janusson | A61F 2/5046 623/36 |
| 2006/0017200 | A1 | * | 1/2006 | Cundiff | B29C 70/44 264/511 |
| 2007/0017629 | A1 | * | 1/2007 | Ito | B29C 45/14008 156/242 |
| 2013/0189482 | A1 | * | 7/2013 | Dequine | B29C 43/52 428/130 |
| 2013/0334734 | A1 | * | 12/2013 | Takahashi | B29C 70/467 264/257 |
| 2014/0052067 | A1 | * | 2/2014 | Sausse | A61M 37/0015 604/173 |
| 2015/0314539 | A1 | * | 11/2015 | Sanchez Gomez | B29C 70/54 156/73.1 |
| 2015/0375444 | A1 | * | 12/2015 | Bamford | B29C 51/18 264/322 |
| 2016/0101575 | A1 | * | 4/2016 | Ashtari | B29C 70/543 264/511 |
| 2016/0233578 | A1 | * | 8/2016 | Kume | H01Q 1/422 |

OTHER PUBLICATIONS

"Coated Peel Plies." Advanced Materials Group (n.d.): n. pag. Freemansupply.com. AirTech, Nov. 1, 2005. Web. <https://www.freemansupply.com/datasheets/Airtech/coatedreleaseply.pdf>.*

United States Department of Labor, Occupational Safety & Health Administration, OSHA Technical Manual (OTM), Section III, Chapter 1 [online] [retrieved on Oct. 28, 2014]. Retrieved from the Internet:<URL: https://www.osha.gov/dts/osta/otm/otm_iii/otm_iii_1.html>.

"Manufacturing Processes for Advanced Composites" edited by Flake C Campbell Jr Elsevier, Dec. 18, 2003, pp. 158-163.

"Fundamentals of Composites Manufacturing, Second Edition: Materials, Methods" by A. Brent Strong, Society of Manufacturing Engineers, 2008, pp. 440-443.

* cited by examiner

APPARATUS FOR AND METHOD OF COMPACTION OF A PREPREG

TECHNICAL FIELD

This disclosure generally relates to a forming apparatus and a method of using the apparatus to compact plies of prepreg to conform to a concave tool surface.

BACKGROUND

Formed composite parts are commonly used in applications, such as aircraft and vehicles, where lightweight and high strength are desired. Fabricating composite parts requires the use of a lay-up tool (also known as a base tool, forming tool or mandrel) on which layers of composite materials laid one ply at a time. Typically, composite materials in the form of pre-impregnated composite fiber plies or "prepregs" such as epoxy impregnated carbon fiber tape, are laminated using some combination of hand lay-up or automated machine lay-up tool. When the forming tool has a concave cavity an operator must manually manipulate each ply of the prepreg in order to conform the ply to the concave shape of the tool in order to ensure a high quality final part. This may require the operators to use their fingertips to push and form the ply into the cavity causing fatigue. Further, reaching down into the cavity is not ergonomic and can result in non-uniform application of pressure that may create variations in ply thickness of the formed composite part. Traditional plastic sweep tools are not effective to conform plies to such concave tooling because they do not match the shape of such tools. This degree of manual labor can result in time-consuming and costly fabrication.

Accordingly, there is a need for a forming apparatus and a method of using such an apparatus that can replace the existing manual methods and that can effectively and efficiently conform composite plies to the cavity contours of concave mandrels.

SUMMARY

The disclosed embodiments provide a forming apparatus and a method of using the apparatus to prepare laminates of prepreg plies that can be subsequently cured to form composite structural components having a concave/convex cross-section.

The forming apparatus of this disclosure is configured specifically for use with a mandrel or lay-up tool that has a concave cavity. The forming head of the apparatus is manufactured to have an outer surface that matches the contour of the interior surface of the concave cavity with which it is to be used with. The apparatus has a handle with a first end and a second end, where the first end is attached to the forming head and the second end is configured as a grip surface. The grip surface allows a technician or operator to exert a downward force on the apparatus such that forming head contacts and conforms a ply of prepreg to the interior surface shape of the concave cavity of the mandrel.

The handle of the apparatus can be pivotally attached to the forming head such that the forming head can be directed into the concave cavity and ergonomically manipulated by an operator. The forming head preferably is fabricated using one or more materials such that the resultant outer surface of the forming head has a measured hardness less than the interior surface of the mandrel. The forming apparatus can also incorporate one or more force and/or strain gauges to measure the compaction force being applied to the plies of prepreg during the lay-up process.

Methods for forming a prepreg laminate in a concave tool using the forming apparatus disclosed above can include placing a first prepreg ply into a cavity of a concave mandrel having an interior surface. The placed prepreg ply is then optionally heated with a heating element that can be incorporated in the forming apparatus instead of a stand-alone device. Once the prepreg ply is optionally heated to a predetermined temperature, the forming apparatus is manipulated within the cavity so that it is adjacent to the prepreg ply. The forming head of the forming apparatus has an outer surface contour that matches the interior surface contour of the cavity of the concave mandrel. A force is applied to forming apparatus in a generally longitudinal direction to contact the forming head with the heated prepreg ply to conform the prepreg ply to match the interior surface of the cavity. The forming apparatus is then removed from the cavity and a second prepreg ply is placed over the first ply and the conforming steps are repeated. These steps are again repeated until a predetermined number of prepreg plies are laid up and a final laminate of prepreg plies is formed. A backing film on the prepreg can be removed after optional heating and before inserting the forming apparatus into the cavity. The final prepreg laminate can then be cured to form a composite laminate structure.

The features, functions, and advantages that have been discussed can be achieved independently in various embodiments or may be combined in yet other embodiments, the further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

The forming apparatus of the present disclosure is designed and configured for use with lay-up tools, also referred to as forming tools or mandrels, having one or more concave cavities. These concave cavities can have uniform symmetrical interior surface contours or non-uniform contours. For a specific concave mandrel having a specific interior surface contour of the cavity it is desired to have a matching forming head on the forming apparatus of the present disclosure. Stated differently, for a specific concave mandrel, a forming head is fabricated such that the outside surface contour of the forming head matches the interior surface contour of the cavity of the specific concave mandrel. By matching the contour of the forming head to the contour of the cavity this allows a prepreg ply to be fitted or conformed to exact shape of the cavity and eliminates or significantly reduces bridging of each added ply during the lay-up procedure.

Figure 1A:
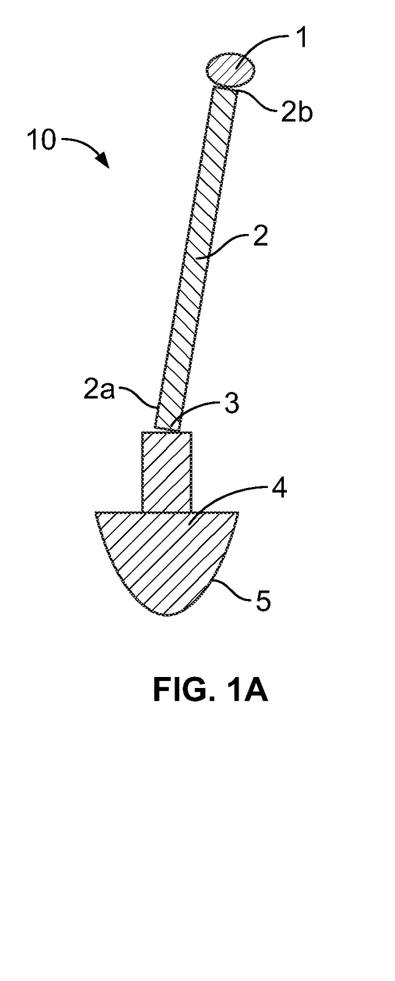
FIG. 1A is a cross-sectional view of one possible embodiment of the forming apparatus of this disclosure.
Figure 1B:
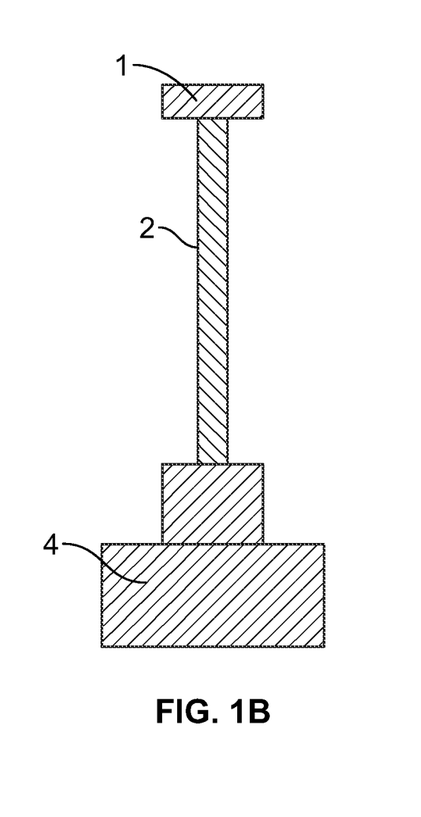
FIG. 1B is a cross-sectional view of the embodiment shown in FIG. 1A rotated 90 degrees.
Figure 2:
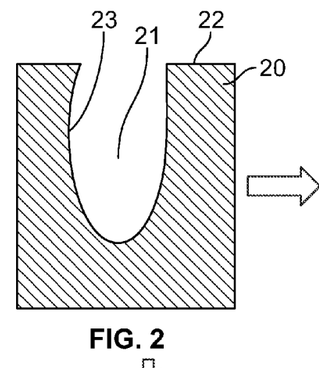
FIG. 2 is a cross sectional view of one possible concave mandrel that can be used to form a composite of laminated prepregs.

One possible example of a forming apparatus 10 is illustrated in FIGS. 1A and 1B. The forming head 4 has an outside surface 5 having a contour that is matched to a specific matching mandrel 20 (see FIG. 2) having an interior surface 23 having the same or matching contour as the outside surface 5. The forming head 4 is attached to a handle 2 at a first end 2a. A grip 1 is attached or forms part of the second end 2b of the handle 2. The connection 3 between the forming head and the handle can allow the handle to pivot relative to the forming head The forming head 4 can be made of a single piece of material or a mixture of materials and can be fabricated from solid materials, layered materials or foam type materials having pores of any shape or size.

Fabrication can include traditional or conventional techniques and/or digital additive techniques, where three-dimensional printing is employed to transform engineering design files into fully functional and durable objects created from a variety of materials, including, for example, polymers, metals and ceramics. This additive manufacturing technology can create a forming head layer by layer. Heat and/or chemicals bind each layer as the next layer is added and the binding process is repeated enabling complex contours and geometries to be manufactured directly from computer-aided design (CAD) data that digitally represent the contour of a concave cavity of a specific mandrel. By adding consecutive layers of materials during the fabrication process the resultant forming head can be made with two or more layers of material to simulate manual fingertip compaction.

Regardless of the material(s) used to construct the forming head it is preferred that the outside surface 5 have a measured hardness that is less than the interior surface 23 of the mandrel 20. Hardness is typically defined as a material's resistance to permanent indention and is usually measured using a durometer. Several scales commonly referred to as Shore Hardness represent the hardness of a polymeric material. Scale A represents softer polymers and Scale D represents harder polymers. For example, the outside surface 5 can have hardness 40 Shore A. The hardness and material selection depend on the ply 30 material and mandrel 20 cavity shape, but the expected range is between 40 Shore A to 80 Shore A. Alternatively, the hardness of the outside surface 5 may also be selected to simulate the hardness of human finger tips so as to best duplicate the manual hand lay-up and conforming process for each ply added.

The outside surface 5 of the forming head can also be fabricated using a material that will not adhere or stick to either the interior surface 23 or to a ply of prepreg 30, with or without attached release film 31. Alternatively, a removable non-stick film can be used to cover the outside surface 5. The non-stick layer or film can also be applied by spraying, brushing or tape application.

The handle 2 and grip 1 can be fabricated from a variety of materials and configured in any convenient shape. The length of the handle 2 is preferably long enough such that the grip 1 extends above the uppermost surface 22 of mandrel 20. The handle could be fabricated as a telescopic handle so that the length can be adjusted to present the operator a more ergonomic set-up. The grip 1 can be made of the same materials as the handle 2 or from different materials. The grip and handle can be solid, hollow, or porous and can have a variety of shapes, including, straight, curved, and crossed.

FIGS. 2 through 7 illustrate one possible method of preparing a composite laminate using the forming apparatus of this disclosure. Starting with FIG. 2, a first step common to the processes and systems described in this disclosure involves providing a suitable forming tool, lay-up tool or mandrel 20. Existing forming tools can be used or in some circumstances a mandrel is specifically fabricated to represent the tooled surface of the desired finished part that could be used to manufacture a composite leading edge, for example, of an aircraft wing or blade. Mandrel 20 is representative of forming tool that could be used in the preparation of such an aircraft parts. In order to fabricate the forming head 4 to generally match the contour of interior surface 23, the fabrication process can be based on a physical mold of cavity 21 or the digital design data of cavity 21 in an additive manufacturing process or using conventional fabrication techniques. As used herein, "generally match" means that the shape of the outside surface 5 of the forming head 4 is generally the same shape as the interior surface 23 of the concave mandrel, but the size of the forming head 4 maybe less than or equal to the volume circumscribed by the interior surface 23. Using the latter method allows the forming head to be fabricated with multiple rubber or polymeric layers having varying hardness that can be selected for compatibility with the physical characteristics of the particular prepreg ply material to be used in the lay-up procedure.

Figure 3:
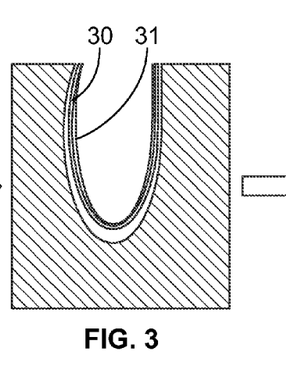
FIG. 3 is a cross sectional view of the mandrel of FIG. 2 with a first ply of prepreg placed inside the cavity of the concave mandrel.

A first ply 30 is placed in cavity 21 as illustrated in FIG. 3. Prior to placing the first ply of prepreg in the cavity, the cavity can be sprayed, brushed or otherwise coated with a material that acts as a releasing film to assist in the removal of the final fully laid up composite. It will be appreciated that the ply may be any suitable material for forming composite parts, including prepreg or pre-cure lamina. The prepreg 30 can be in a sheet form and made from a pre-impregnated composite of fibers, where a matrix material, such as epoxy or thermoplastic, is already present. The fibers often take the form of a weave or unidirectional fiber orientation and the matrix is used to bond them together and to other components during manufacture. The matrix may optionally be partially cured to allow easy handling. A release or backing film can be used on the top and bottom of the sheet of prepreg to aid in the handling of the normally tacky prepreg. Before placing the prepreg ply into cavity 21 of mandrel 20 one layer of release film can be removed leaving the outward facing or outer layer of release film 31 in place as illustrated in FIG. 3. Alternatively, for the first ply that is formed into the concave cavity tool, both layers of release film maybe left in place. The release film is preferably composed of fluorinated ethylene-propylene (FEP) and selected so as not to adversely affect the resin content and/or resin-to-fiber ratio of the composite charge used in the lay-up method. Other types of release films can be used, including, but not limited to, polytetrafluoroethylene (PTFE), ethylene tetrafluoroethylene (ETFE), Polyvinyl Fluoride (PVF) and TOOLTEC® (reinforced PTFE coated fiberglass with adhesive), or polyethylene film. The release film can have a thickness in the range of from about 0.002 to about 0.010 inches.

Figure 4:
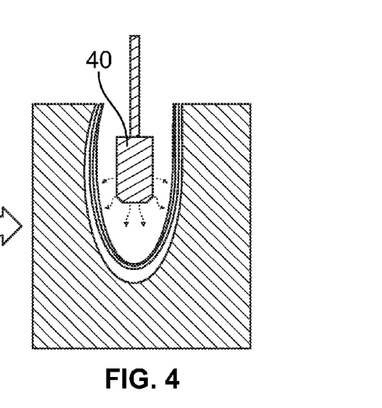
FIG. 4 is a cross sectional view of a heating element inserted into the cavity of the concave mandrel of FIG. 3 to heat the placed prepreg ply.
Figure 8A:
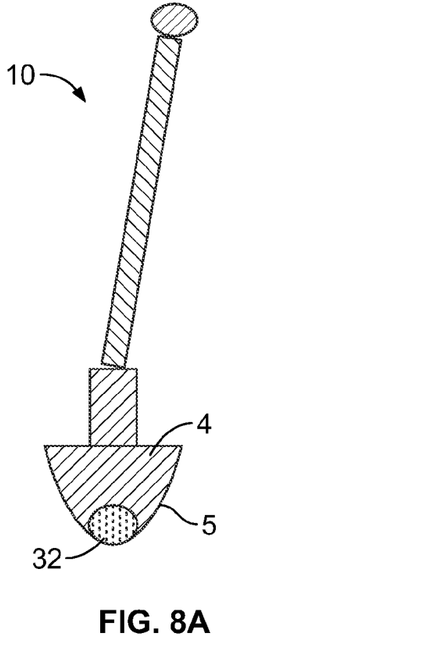
FIGS. 8A-8D illustrates several possible alternative embodiments of the forming apparatus of the present disclosure.
Figure 8B:
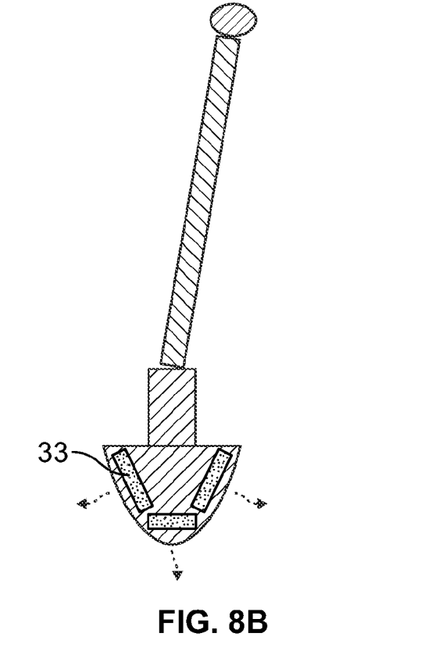

Once the prepreg ply is generally placed in the cavity a heating element 40, as shown in FIG. 4, can optionally be used to heat and soften the prepreg ply 30. Heating and/or warming of the prepreg allows it to be more easily conformable to the forming tool as opposed to a composite charge at ambient or room temperature. Heating can be accomplished using hot air, infrared lamps, conventional light bulbs, heating elements or any other known heating techniques. In some circumstances heating of the prepreg can continue during the forming process. Depending on the composition of the prepreg, the temperature of the ply can be raised to less than 200° F., preferably in the range of from about 130° F. to about 140° F. The temperature of the prepreg ply can be measured in any conventional manner. It is also within the scope of this disclosure that the forming head 4 of apparatus 10 could incorporate one or more heating elements 33 as generally depicted in FIG. 8B. Likewise, the placed prepreg ply could be heated as a result of being placed in the forming apparatus that is heated using one or more integral heating elements. This would then eliminate the need to use a separate stand-alone heating element, such as, element 40. Additionally, thermocouples or other temperature sensors could be incorporated into the forming head 4 to monitor temperature and assist in the controlled heating of the prepreg.

Figure 5:
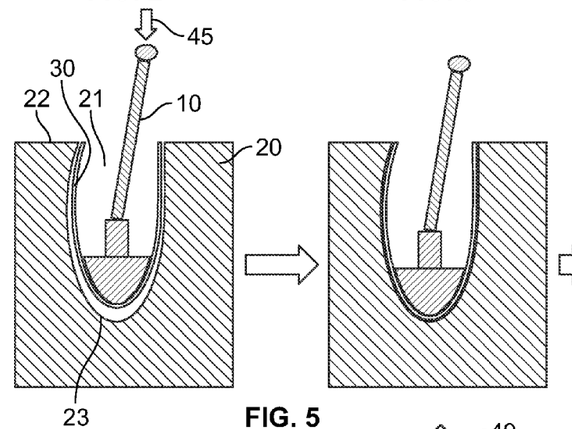
FIG. 5 illustrates the sequential process of conforming the prepreg ply to the interior surface of the mandrel.
Figure 8C:
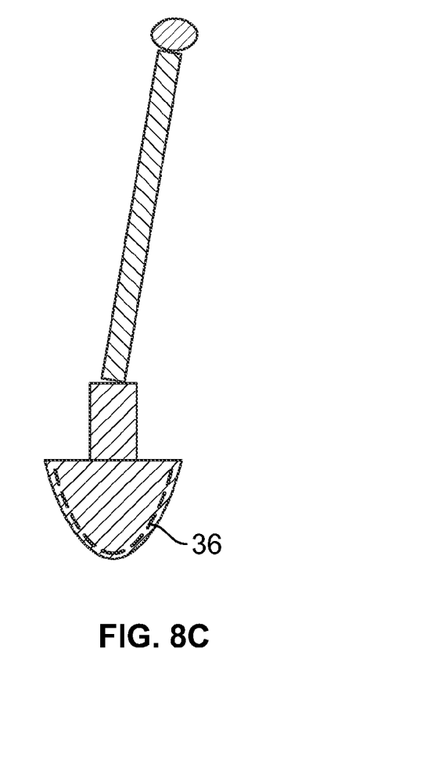
Figure 8D:
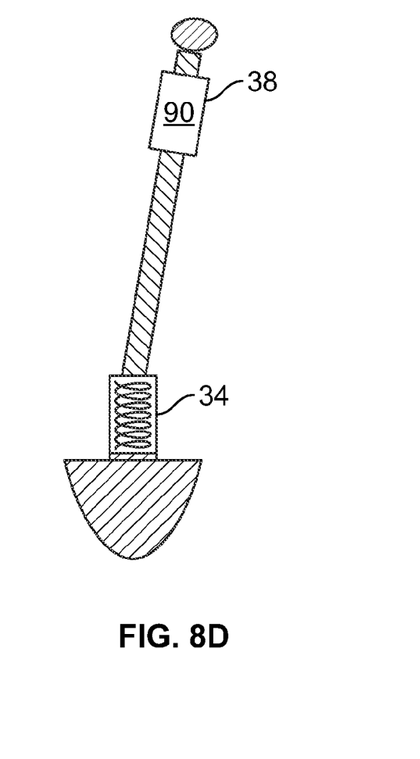

After heating the prepreg ply to a desired temperature or degree of softness, the release film 31, if it was left in place during the optionally heating step, is removed and the forming apparatus 10 is then introduced into the cavity 21 as shown in FIG. 5 to cause conformance and compaction of ply 30 to the contour of the interior surface 23 of cavity 21. An operator or technician holding grip 1 and pushing downward generally along the longitudinal axis of the handle generates a force that is applied in the direction. Alternatively, the forming apparatus 10 may be of sufficient mass that its weight will generate a sufficient gravitational force to cause the desired conformance and compaction of ply 30. This could occur, for example, if the forming apparatus 10 is released from a support that initially holds the apparatus above the cavity 21 allowing the weight of the apparatus 10 to generate the needed downward force. In either case, the forming head 4 is worked into the bottom of cavity 21 by manipulation of the grip/handle until the optionally heated prepreg 30 is conformed to the exact shape of the interior surface 23 of cavity 21. Depending on the specific contour of the cavity, it may be necessary to use a forming apparatus 10 having a forming head 4 that incorporates one or more rollers as generally illustrated in FIG. 8A. To prevent over compaction of the prepreg ply it may be convenient to use a forming head that has incorporated therein one or more strain gauges 36 that monitor and report forces exerted by the outside surface 5. One possible location of these strain gauges is depicted in FIG. 8C. It is also possible to configure the forming apparatus 10 to include a digital force gauge 34 that includes display 38 to report a force measurement, and possibly a temperature readout, as exemplified in FIG. 8D. Of course, any or all of the various alternative apparatus designs depicted in FIGS. 8A-8D could be incorporated into forming apparatus 10. As mentioned, although the shape of the outer surface 5 of the forming head is preferably generally matched to the shape of the interior surface 23, the volume or size of the forming head 4 is preferably less than or equal to volume circumscribed by the contour of the interior surface 23 such that the forming head 4 can be inserted into the concave cavity when one or more plies have been lay-up. Stated differently, the interior surface of the concave cavity may have a unique shape and the outer surface of the forming head is then fabricated to generally match that unique shape while having a size that allows the forming head to be placed into the concave cavity when one or more plies of prepreg have been placed in the concave cavity.

Figure 6:
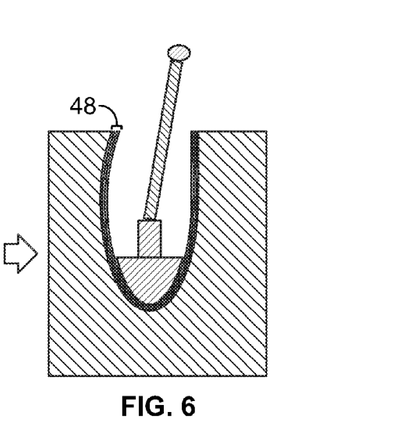
FIG. 6 is a cross sectional view of multiple plies of prepreg that have been conformed to the concave cavity of the mandrel.

The forming steps of FIGS. 3-5 can be repeated with additional plies of prepreg to ultimately build-up and form a composite of multiple prepreg plies 48 (see FIG. 6). The number of plies used to form the composite 48 can vary depending on the desired structural properties of the finish part as dictated by the ultimate end use of the part. Once composite 48 is formed the mandrel may be vacuum bagged with a forming membrane 43 and a vacuum drawn to further consolidated and conform the composite plies 48 to the cavity 21 as illustrated generally in FIG. 7. The forming membrane is preferably composed of silicone, however, other known membranes suitable to vacuum forming can be used, such as, polyvinyl alcohol or nylon based films. Once the forming membrane is in place, the end portions 85 are sealed with a seal 86, which preferably comprises a butyl rubber or other common vacuum bag sealant tape applied to both the lay-up system perimeter and the underside of the forming membrane 43. Alternatively, an elastomer blade seal could be used to provide a reusable and easily releasable seal. The seal holds end portions 85 of the forming membrane in such a manner that when a vacuum is drawn the forming membrane is drawn downward with a strong force to further consolidate the composite 48.

Although a number of methods can be used to draw a vacuum to cause the forming membrane to conform to the shape of the tool surface, a preferred approach is to operatively couple a vacuum source to the lay-up system in a known manner so as to operate the vacuum source and draw or pull a vacuum through channels located on an underside of the mandrel or lay-up system base. These channels would be in fluid communication with holes or other orifices extending upwards within an area inside a perimeter defined by the seal securing the forming membrane to the lay-up system. In some circumstances, vacuum can be transported using a nylon tube bag having a breather material inside. Also, in some cases, depending on the design and/or shape of the forming, small holes or orifices can be used to provide a fluid evacuation flow path from the mandrel surface to an inside or hollow portion of the mandrel. These holes allow the forming membrane to be drawn down more tightly around the forming tool surfaces, especially if the mandrel is very contoured.

Figure 7:
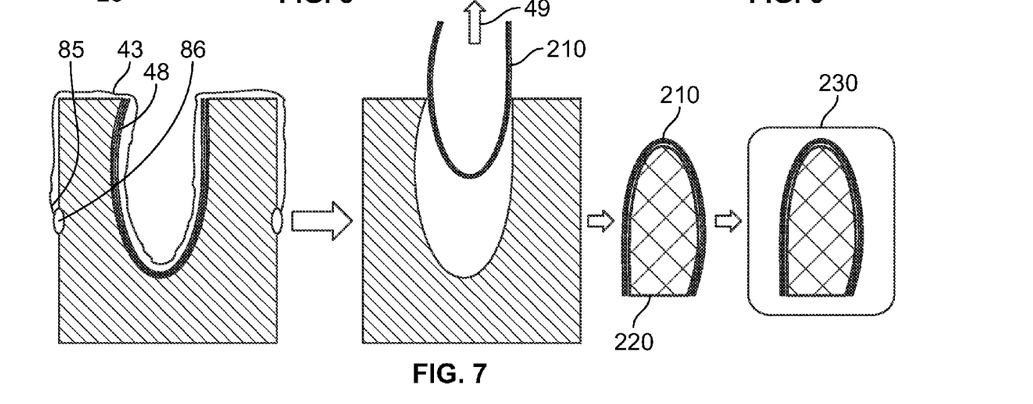
FIG. 7 illustrates the conformed composite of laminate of prepreg plies being removed from the mandrel and then placed in a curing apparatus.

Once consolidation is complete the now formed composite 210 can be removed from the mandrel 20 and placed on a curing tool 220. Of course, in some situations it may be advantageous to lay-up the prepreg plies 48 directly onto a curing tool. In the event transfer to a curing tool is needed, the release film used in the lay-up procedure will remain with the composite plies 210. The release film is typically needed during vacuum bagging curing in an autoclave. Removal of the formed composite charge 210 may be achieved manually or alternatively, removal may be accomplished in an automated manner with mechanical assistance or with other known manufacturing methods that utilize hands-free methods, such as by use of robotic manipulators. Once on the curing tool 220 the formed composite 210 can be vacuum bagged, a vacuum is drawn, and then placed in a curing apparatus 230, for example, an autoclave, as illustrated in FIG. 7. In some cases the formed composite will remain in the mandrel 20 and sent directly to the curing apparatus 230.

In some applications, it may be possible to use additional items in the lay-up process on mandrel 20, such as without limitation, doublers, additional release films, and caul plates, along with the plies of prepreg. For example a composite doubler can be sandwiched between the plies and a carrier film. Similarly, a strip of release film can be sandwiched between the plies and carrier film along the edge margin on the film. This release film may aid in releasing and peeling the carrier film away from the laid up composite. It may also be possible to employ a reinforcement in the layer of the composite plies which allows some degree of deforming of the plies, but less than other, non-reinforced areas. The reinforcement may comprise, for example and without limitation, cross-stitching in the one or more prepreg plies.

The methods of this disclosure can also employ one or more carrier films to prevent contamination during transport of the plies of prepreg and to prevent the prepreg from touching any contaminate. The deformable carrier film can be used to support the plies of prepreg during a lay-up process and then to transport the laid up plies to a cutting table. As the cutting table typically is not a contact surface, meaning the table should not directly contact the pre-preg material, the carrier film will provide a barrier between the pre-preg and the cutting table. The laid up plies can then be cut using an ultrasonic knife to cut the large sections down to smaller pieces that are then laid up to the mandrel.

Figure 9:
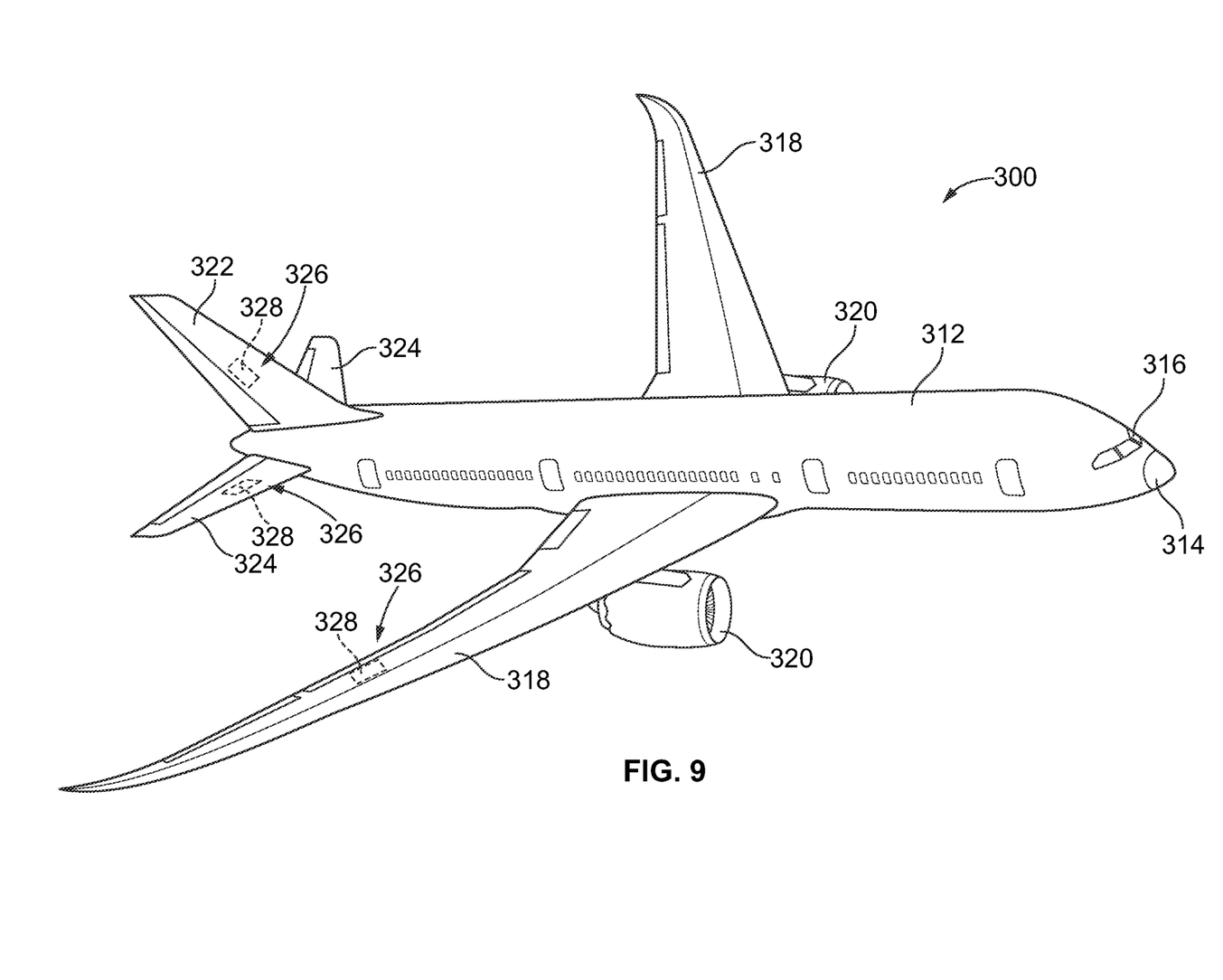
FIG. 9 is an illustration of a perspective view of an aircraft that may incorporate one or more composite laminates manufactured in accordance with one or more embodiments disclosed herein.

FIG. 9 is an illustration of a perspective view of an aircraft 300 that may incorporate one or more composite laminate parts manufactured by one of the embodiments of the present disclosure. As shown in FIG. 9, the aircraft 300 comprises a fuselage 312, a nose 314, a cockpit 316, wings 318 operatively coupled to the fuselage 312, one or more propulsion units 320, a tail vertical stabilizer 322, and one or more tail horizontal stabilizers 324. Although the aircraft 300 shown in FIG. 9 is generally representative of a commercial passenger aircraft, the one or more composite laminates, as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of structures and methods in accordance with the disclosure may be utilized in other transport vehicles, such as boats and other watercraft, trains, automobiles, trucks, buses, or other suitable transport vehicles formed from or utilizing the composite laminates as disclosed herein.

Figure 10:
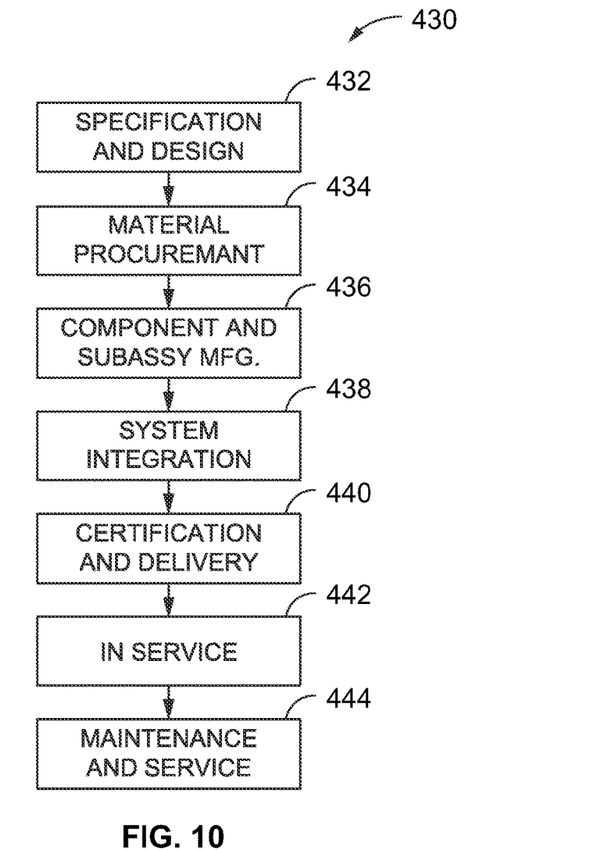
FIG. 10 is an illustration of a flow diagram of an embodiment of an aircraft production and service method of the disclosure.
Figure 11:
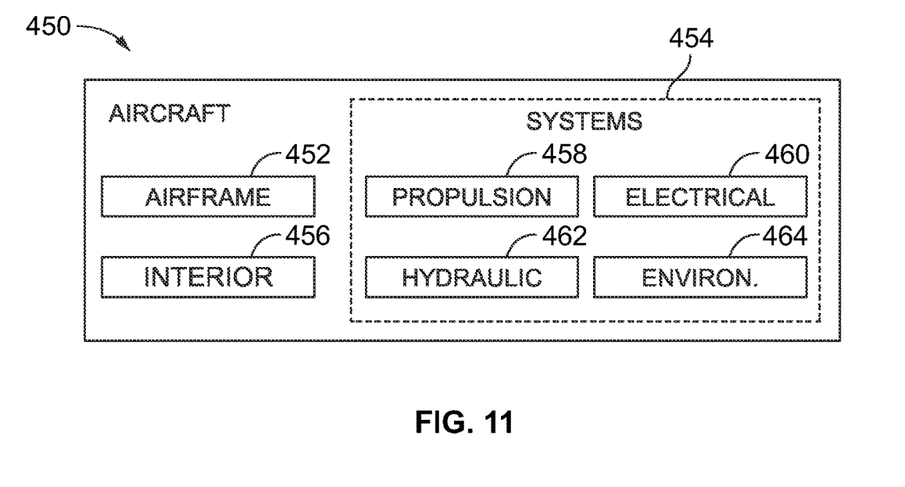
FIG. 11 is an illustration of a functional block diagram of an aircraft.

Embodiments of the disclosure may find use in a variety of potential applications, particularly in the transportation industry, including for example, aerospace, marine, automotive applications and other application where thermoplastic composite tubular or hollow cross-sectional structures may be used. Therefore, referring now to FIGS. 10 and 11, embodiments of the disclosure may be used in the context of an aircraft manufacturing and service method 430 as shown in FIG. 10 and an aircraft 450 as shown in FIG. 11. Aircraft applications of the disclosed embodiments may include, for example, without limitation, the design and fabrication of composite laminates fabricated by way of the lay-up methods and systems as disclosed herein.

During pre-production, exemplary method 430 may include specification and design 432 of the aircraft 450 and material procurement 434. As just one example, for the specification and design of the aircraft related composite laminates formed using complex shaped forming tools or mandrels having one or more concave cavities, may be determined at this step. As just one example, at this step, it may be determined that complex shaped structural supports are needed requiring mandrels with concave cavities that require the use of the forming apparatus described in this disclosure to form the required composite.

As another example, during this specification and design step, in one particular composite laminate arrangement, lay-up or forming methods that use forming heads on a forming apparatus that match the contour of a concave cavity of a specific matched mandrel will prevent bridging and/or out-of-plane buckling of the composite plies of prepreg at interior surface of the cavity of the matched mandrel may be determined. In addition, during this specification and design step, the use of a heating element, rollers, force and/or strain gauges may be selected with a configuration that supports the forming membrane such that the plies of prepreg can conform precisely to the contour of the cavity without buckling or bridging. As just another example, at this design step, it may be determined that additional lay-up assembly items may be required for a specific composite part, such as doublers, release films, and caul plates.

During production, component and subassembly manufacturing 436 and system integration 438 of the aircraft 450 take place. As explained in greater detail above, FIGS. 1-9 illustrate only several possible types of forming apparatus and forming steps for fabricating composite laminate utilizing a forming head that is matched to the contour of a specific cavity of a particular mandrel. After such a component and subassembly manufacturing step, the aircraft 450 may go through certification and delivery 440 in order to be placed in service 442. While in service by a customer, the aircraft 450 is scheduled for routine maintenance and service 444, which may also include modification, reconfiguration, repair, refurbishment, and so on.

Each of the process steps of method 450 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 450 produced by exemplary method 430 may include an airframe 452 with a plurality of high-level systems 454 and an interior 456. Examples of high-level systems 454 may include one or more of a propulsion system 458, an electrical system 460, a hydraulic system 462, and an environmental system 464. Any number of other systems may be included. Although an aerospace example is shown, the principles of the disclosure may be applied to other industries, such as the marine and automotive industries.

Systems and methods embodied herein may be employed during any one or more of the stages of the production and service method 430. For example, components or subassemblies corresponding to production process may be fabricated or manufactured in a manner similar to components or subassemblies produced while the aircraft 450 is in service. Also, one or more apparatus embodiments, method embodiments, or a combination thereof may be utilized during the production stages 432 and 434, for example, by substantially expediting assembly of or reducing the cost of an aircraft 450. Similarly, one or more of apparatus embodiments, method embodiments, or a combination thereof may be utilized while the aircraft 450 is in service, for example and without limitation, to maintenance, repair, and service 444.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The invention claimed is:

1. An apparatus for use in conforming a prepreg to a concave cavity of a mandrel, comprising:
    a forming head comprising an outer surface having a contour that generally matches an interior surface of a concave cavity of a matching mandrel, and wherein the forming head further comprises a heating element incorporated into the forming head to heat the outer surface of the forming head, wherein the outer surface of the forming head comprises a material that has a measured hardness in a range of between 40 Shore A to 80 Shore A; and
    a handle with a first end and a second end, where the first end is attached to the forming head and the second end is configured with a grip surface, where the first end of the handle is pivotally attached to the forming head.

2. The apparatus of claim 1 where the outer surface of the forming head comprises the material that has a measured hardness less than the interior surface of the mandrel.

3. The apparatus of claim 1 where the forming head comprises two or more layers of material to simulate fingertip compaction.

4. The apparatus of claim 1 further comprising a force gauge configured to measure the force being applied to one or more plies of prepreg when the forming head is used to conform the one or more plies of prepreg to the interior surface of the concave cavity.

5. The apparatus of claim 1 where the forming head is configured with a roller.

6. The apparatus of claim 1 where the handle has a length such that the grip surface extends above an uppermost surface of the matching mandrel when the forming head is positioned within the interior surface of the concave cavity of the matching mandrel.

7. The apparatus of claim 1 where the outer surface of the forming head is fabricated based on a mold taken of the concave cavity.

8. The apparatus of claim 1 where the outer surface of the forming head is fabricated based on digital data defining the concave cavity.

9. The apparatus of claim 1 where the interior surface has a unique shape and the outer surface of the forming head is fabricated to generally match the unique shape while having a size that allows the forming head to be placed into the concave cavity after one or more plies of prepreg have been placed in the concave cavity.

10. The apparatus of claim 1 where the forming head further comprises a digital force gauge including a display to display a force measurement of a force applied to the outer surface of the forming head.

11. The apparatus of claim 1 where the forming head further comprises a digital force gauge including a display to display a temperature readout.

12. A system comprising:
    a mandrel having a concave cavity that is configured to hold a first prepreg ply placed into the concave cavity of the mandrel;
    a forming head for conforming the first prepreg ply to the concave cavity of the mandrel, the forming head comprising an outer surface having a contour that generally matches an interior surface of the concave cavity of the mandrel, and wherein the forming head further comprises a heating element incorporated into the forming head to heat the outer surface of the forming head, wherein the outer surface of the forming head comprises a material that has a measured hardness in a range of between 40 Shore A to 80 Shore A; and
    a handle with a first end and a second end, where the first end is attached to the forming head and the second end is configured with a grip surface.

13. The system of claim 12 where the forming head further comprises a temperature sensor to monitor temperature of the forming head.

14. An apparatus for use in conforming a prepreg to a concave cavity of a mandrel, comprising:
    a forming head comprising an outer surface having a contour that generally matches an interior surface of a concave cavity of a matching mandrel, and wherein the forming head further comprises a heating element incorporated into the forming head to heat the outer surface of the forming head, wherein the outer surface of the forming head comprises a removable non-stick film; and
    a handle with a first end and a second end, where the first end is attached to the forming head and the second end is configured with a grip surface, where the first end of the handle is pivotally attached to the forming head.

* * * * *